United States Patent
Orikasa et al.

(10) Patent No.: US 6,754,319 B1
(45) Date of Patent: Jun. 22, 2004

(54) NETWORK SYSTEM AND METHOD FOR AUTOMATICALLY INTERFACING WITH COMMUNICATION APPARATUS OF DIFFERENT STANDARD

(75) Inventors: Noriaki Orikasa, Atsugi (JP); Shouzi Okabe, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 143 days.

(21) Appl. No.: 09/675,100

(22) Filed: Sep. 28, 2000

(30) Foreign Application Priority Data

Sep. 30, 1999 (JP) ............................................. 11-278611
Mar. 10, 2000 (JP) ........................................ 2000-066984

(51) Int. Cl.[7] ............................................. H04M 11/00
(52) U.S. Cl. ................................ 379/93.29; 379/93.05; 379/93.09
(58) Field of Search ........................... 379/93.05, 93.06, 379/93.09, 93.29, 93.31, 93.32, 394, 398, 399.01; 375/220

(56) References Cited

U.S. PATENT DOCUMENTS

| 5,430,793 | A |   | 7/1995 | Ueltzen et al. |
| 6,091,806 | A | * | 7/2000 | Tasmus et al. ............ 379/93.05 |
| 6,359,973 | B1 | * | 3/2002 | Rahamim et al. ......... 379/93.05 |
| 6,516,024 | B1 | * | 2/2003 | Dupuis et al. ............... 375/220 |

FOREIGN PATENT DOCUMENTS

| EP | 0766447 A2 | 4/1997 |
| JP | 8335994 | 12/1996 |

OTHER PUBLICATIONS

Oct. 28, 2003 official Communication and European Search Report.

* cited by examiner

Primary Examiner—Melur Ramakrishnaiah
(74) Attorney, Agent, or Firm—Cooper & Dunham LLP

(57) ABSTRACT

A communication apparatus including a network control unit for interfacing with a telephone line. The network control unit comprises a direct current circuit in which a loop state direct current can flow, and a direct current limiting device for limiting the loop state direct current to a prescribed value when communication with a foreign country that has adopted a different communication standard is performed.

5 Claims, 10 Drawing Sheets

NETWORK SYSTEM AND METHOD FOR AUTOMATICALLY INTERFACING WITH COMMUNICATION APPARATUS OF DIFFERENT STANDARD

CROSS-REFERRENCE TO RELATED APPLICATIONS

This application claims priority of Japanese Patent Application Nos. 11-278611 filed on Sep. 30, 1999 and 2000-066984 filed on Mar. 10, 2000, the entire contents of which are hereby incorporated herein by reference.

BACKGROUND OF THE INVENTION

1. Field of the Invention

The present invention generally relates to a communication apparatus, and in particular relates to a telephone line interface between a facsimile and a copier, a printer, and/or a card MODEM or the like that has a facsimile function.

2. Discussion of the Background Art

Recently, communication standards adopted by European countries have been unified into the Common Technical Regulation 21 (hereinafter referred to as the CTR 21).

However, the characteristics of a direct current that flows through a network control section of a communication apparatus, e.g., a facsimile, are different from those of the conventional standard. Namely, a direct current is required to have nonlinear characteristics that arise due to limits on a direct current that flows through a direct current circuit.

Further, since communication standards adopted by many countries (excepting Europe) are not uniform, linear characteristics are required in several countries, and the direct current characteristics must be changed to those of a destination country.

Therefore, two different baseboards for generating direct currents with different characteristics are necessary in the network control section of communication apparatus when communication with another country that has adopted a different communication standard is performed. Namely, a network control unit having both a background direct current circuit which does not limit a direct current to a prescribed value and that having the direct current circuit for the CTR 21 use, i.e., which limits a direct current, should be provided.

Further, the characteristics of a network, except for external line network connections executed by a public exchanger based on the Post Telephone Telegram standard (hereinafter referred to as the PTT standard) of the country, are sometimes not based on the PTT standard of the applicable country.

Specifically, an internal line exchanger that operates with a constant current is included among internal line exchangers, such as a small business use internal exchangers (hereinafter referred to as a PABX), a home PABX, and large scale exchangers employed in a business as a private line.

When using such an internal line exchanger, it has been shown that it is impossible to form a network connection between a communication apparatus and an internal line exchanger if the communication apparatus operates at a current value in excess of the prescribed limit upon the direct current. This is because the network characteristic of the internal line exchanger generally depends upon the manufacturer.

Further, there are strict standards for parameters related to control operations of the general public line networks above and beyond other networks. However, parameters related to control operations of other networks can be, to a large degree, set in consideration of general-purpose uses. Thus, the above-mentioned current limitation is generally not applied in internal line exchangers.

For example, the Japanese Patent Application laid Open No. 8-335994 describes technology related to the above-mentioned apparatus. The technology changes the characteristics of the direct current based on a country by connecting resistors in parallel to a photo relay. Thereby, it is possible to generate a direct current in accordance with a standard of the telephone line of an applicable destination country using a direct current generating circuit with a simple construction.

However, the above-mentioned related technology can not generate a direct current that includes nonlinear characteristics that limit a current flowing through the circuit to a prescribed value. Further, it is not necessary (or, in some cases, desirable) to directly limit a current that flows through a circuit when controlling a network except when the network is the general public line network. This is thus a source of problems.

SUMMARY OF THE INVENTION

The present invention has been made in view of the above noted and another problems and one object of the present invention is to address and resolve such problems.

A further object of the present invention is to provide a novel communication apparatus including a network control unit configured to interface with a telephone line. The network control unit may include a direct current circuit configured to carry a loop state direct current, and an electrical characteristic changing device configured to change one or more electrical characteristics of the direct current circuit so that the one or more electrical characteristics of the direct current circuit complies with a communication standard adopted by the other communication apparatus.

In yet another embodiment, the one or more electrical characteristics may include a limit (to a prescribed value) on a loop state direct current flowing through the direct current circuit, as well as a lack of limits thereon.

In yet another embodiment, the one or more electrical characteristics may be a limit upon the direct current when communication with a prescribed foreign country occurs.

In yet another embodiment, the one or more electrical characteristics may be changed based on a designation of the foreign country.

In yet another embodiment, an electrical characteristic alternating device may be provided to selectively alternate one of a plurality of electrical characteristic with another in correspondence with a kind of communication used and/or desired.

In yet another embodiment, the kind of communication may include external line communication and internal line communication.

In yet another embodiment, the one or more electrical characteristics may be alternated with those of a direct current limiting mode when the communication is transmitted to and from an external line.

In yet another embodiment, a current limiting device may be provided in the direct current circuit to limit a direct current flowing through the direct current circuit to a prescribed value.

In yet another embodiment, a switching device may be provided to select either a direct current limiting circuit configured to limit a direct current to the prescribed value or a direct current non-limiting circuit configured not to limit the direct current.

In yet another embodiment, a display device may be provided to display a screen through which either a direct current limitation mode, where a loop state direct current is limited, or a direct current non-limitation mode, where a loop state direct current is not limited, is set and/or selected.

In yet another embodiment, a dial call-generating device may be provided for generating a dial pulse or a tone signal, and the direct current limit is removed when the dial pulse or the tone signal relates to a network other than the general public line.

In yet another embodiment, the direct current limit may be implemented only when a dialed number of the dial call-generating device includes a prescribed number representing external communication.

In yet another embodiment, a ringing signal detection device may be provided for detecting a ringing signal, and the switching device may be controlled to switch to a direct current non-limiting mode when a ringing wave detected by the ringing signal detection device indicates reception from a network other than the general public line.

In yet another embodiment, a parameter generating device may be provided to generate a parameter representing a limit on the direct current, and the parameter need not be generated and included in parameters related to the control of the network when communication is practiced via a network other than a general public line.

In yet another embodiment, the parameter is set using the setting switch or a screen provided in the communication apparatus.

BRIEF DESCRIPTION OF THE DRAWINGS

A more complete appreciation of the present invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENT

Figure 1:
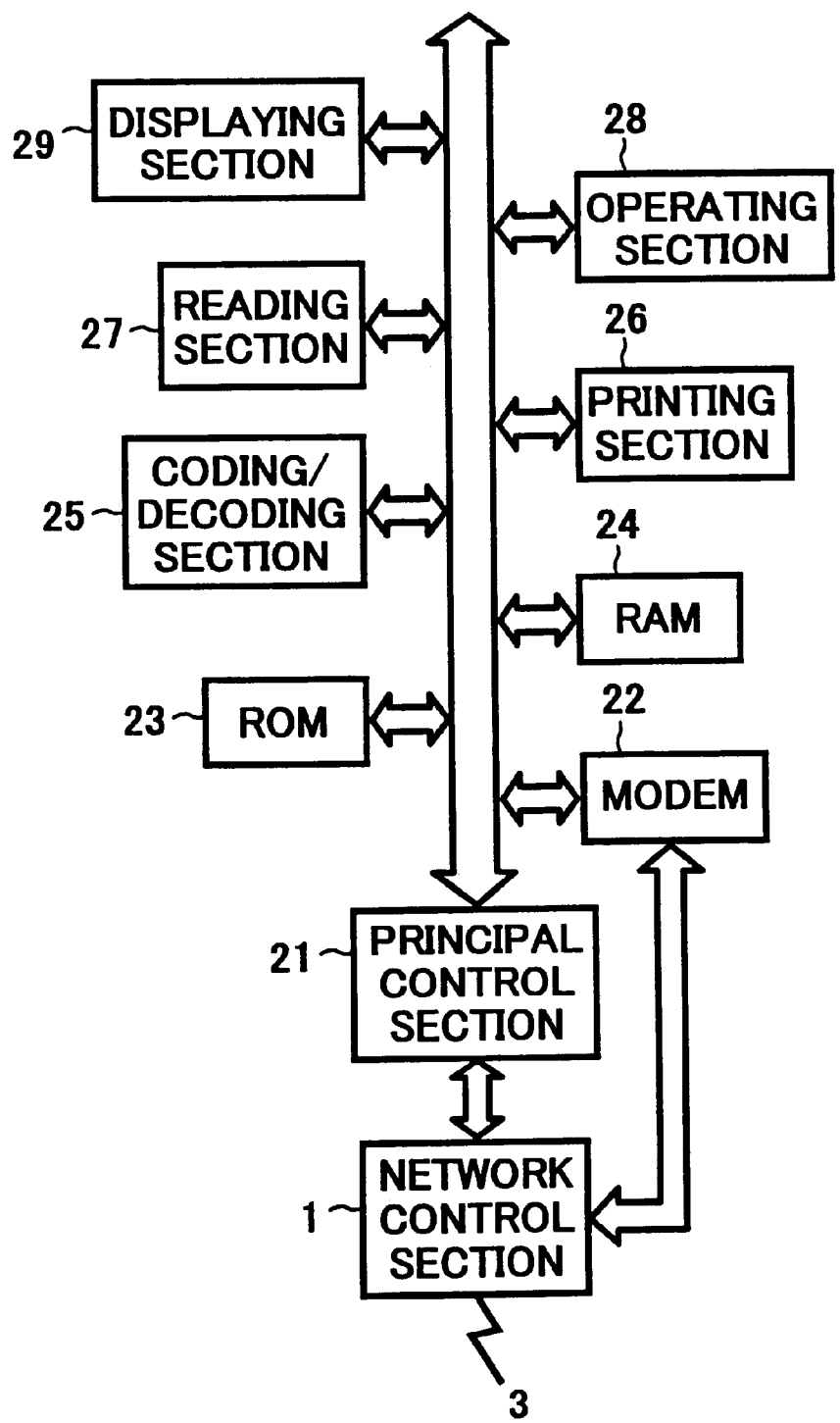
FIG. 1 is a chart illustrating an exemplary construction of the facsimile apparatus of the first embodiment according to the present invention.

Referring now to the drawings, like reference numerals and marks designate identical or corresponding parts throughout several views.

Figure 2:
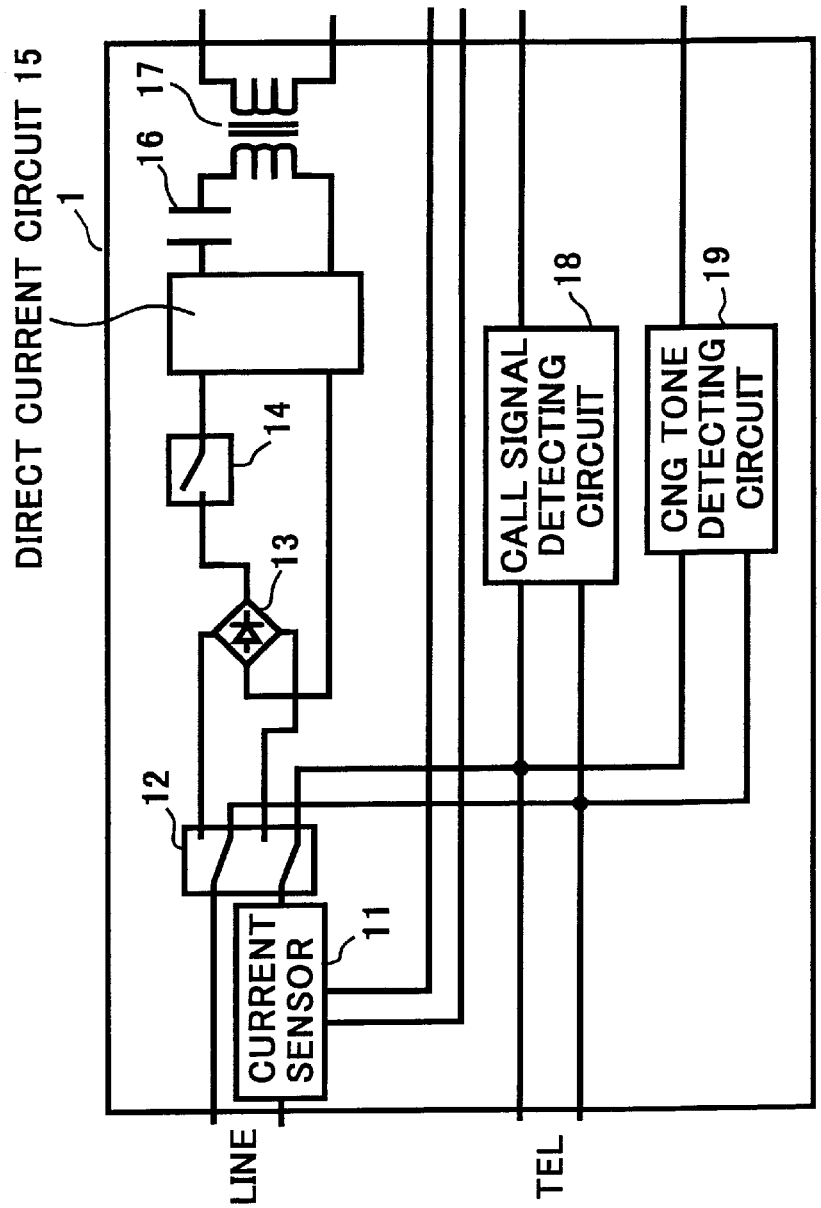
FIG. 2 is a chart illustrating an exemplary construction of the network control section of the facsimile apparatus illustrated in FIG. 1.
Figure 3:
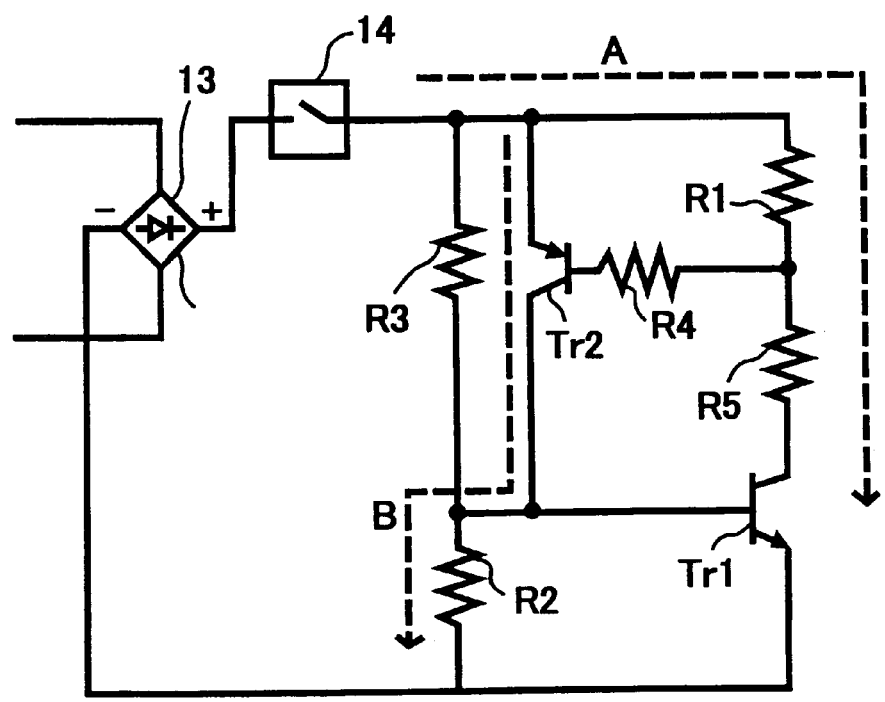
FIG. 3 is a chart illustrating an exemplary construction of the direct current circuit of the network control section illustrated in FIG. 2.

The first embodiment is now described referring to FIGS. 1, 2 and 3. A principal control section 21 may include a central processing unit (hereinafter referred to as a CPU) or similar device and perform processing operations of internal sections and its elements of the facsimile apparatus according to a variety of control programs stored in a ROM 23.

A RAM 24 may store a variety of data and include a work area for use in the control of the facsimile apparatus. The RAM 24 may store a predetermined dial number, such as zero, used when switching from an internal line to an external line, a predetermined dial number used when switching to an internal line from an external line, a frequency of a ringing wave of an internal and/or external line, and/or a cadence ON/OFF time period representing signal ON/OFF timing or the like. Furthermore, the RAM 24 may double as an image memory for storing image data encoded by an encoding/decoding section 25. The encoding/decoding section 25 may compress transmission image data using a prescribed encoding method, such as the MH-MR-MMR encoding method, and may expand and decode reception image data using a prescribed decoding method, such as the MH-MR-MMR decoding method.

A recording section 26 may be provided and may be composed of a conventional electrophotographic system that performs processes such as charging, tracing, exposing, developing, discharging, transferring, separating, and cleaning operations or the like. The recording section 26 may print out image data read, image data received, and a report or the like with a prescribed resolution. The image data received may be printed out on a transfer sheet with a prescribed line density, e.g., 3.85 lines, 7.7 lines, or 15.4 lines per millimeter. A reading section 27 may be provided to optically read, line by line, an original image at a prescribed resolution, and may convert the original image into image data at a corresponding line density.

An operating section 28 may be provided and include the following keys. It may include a start/stop key for generating a trigger signal for each operation, a ten key group as a dial keypad, a one-touch key, a setting/resetting key for setting and resetting a variety of modes, a country designating key for designating a facsimile by country, and/or a function key for performing a variety of other processes. The operating section 28 may transmit information to the principal control section 21 when any of keys is pressed.

A display section 29 may be provided and include a display device, such as a liquid crystal display and/or a light emitting diode. The display section 29 may display information and after it has been inputted and set by the operating section 28 so that a user can confirm the contents thereof.

A MODEM 22 may be connected to a line 3 via a network control section 1. The MODEM 22 may modulate image data to be transmitted to the line 3, and may decode a signal received from the line 3 via the network control section 1.

Further, the MODEM 22 may transmit a DTMF or PB signal, detect a reception signal, and switch from a telephone mode to a facsimile mode, and/or vice versa, thereby performing the prescribed facsimile transmission control operations.

A network control section 1 may be provided and include a ringing/OFF-hook detection device having a later-described call signal detection circuit 19, a dial call generation device including a later-described photo-coupler 14 and a transducer 17, and a later-described direct current circuit 15 or the like.

A network control section 1 may perform a prescribed line control operation during both signal transmission and reception using the principal control section 21 and control the cut off operations and establishment operations of the line. Furthermore, a handset, not shown, may be connected to the network control section 1 and utilized for telephone communication or the like with the other office.

Further, a power source voltage may be supplied to each unit of the facsimile when the principal control section 21 transmits a power source control signal to a power source switching section (not shown). Furthermore, each section may perform any necessary data communication via a bus line.

The network control section 1 may include the following devices illustrated in FIG. 2. A relay 12 capable of connecting to the line 3 through a connection that corresponds to a telephone mode (hereinafter referred to as a "TEL" mode) or a facsimile mode, a current sensor 11 that detects a current flowing through the line 3, and a CNG tone detecting circuit 19 for detecting a tone signal, such as CNG, that indicates that a communication transmitter is a facsimile apparatus, may be provided. A call signal detecting circuit 18 for detecting a ringing signal and binalizing its ringing wave, and a diode bridge 13 for adjusting a polarity of the direct current voltage may be provided.

Further, a direct current circuit 15 in which a loop state direct current can flow, a photo-coupler 14 for controlling opening/closing operations of the direct current loop, i.e., controlling direct current ON/OFF operations, and allowing transmission of a dial pulse of a recipient identification number may also be included. A condenser 16 that does not pass a direct current, and a transducer 17 for transmitting a signal from a primary side to a secondary side and transmitting a DTM or PB signal from the MODEM 22 may be also provided. A prescribed circuit for switching from a two-line side (a line side) to a four-line side (a MODEM side), or vice versa, may be connected to the secondary side (winding) of the transducer 17.

The direct current circuit 15 is now described in more detail referring to FIG. 3. The direct current circuit 15 may include four resistors R1 through R4, and two transistors Tr1 and Tr2. Among those, the transistors Tr2 or similar devices arranged in the route B may form a direct current limiting circuit.

A communication operation of the facsimile apparatus is now described. Before a ringing signal is detected and facsimile communication is performed, the relay 12 illustrated in FIG. 2 is switched to the side of the call signal detecting circuit 18, i.e., the TEL (hand set) side.

A call signal from the line is detected by the call signal detecting circuit 18, and a detection signal is generated.

The detection signal is then inputted to the CPU of principal control section 21, and it is determined if the detection signal indicates a prescribed call signal corresponding to a facsimile communication. If the detection signal is a prescribed call signal, the relay 12 is switched to the transducer side 17 with a command transmitted from the CPU, and thereby the line 3 is closed.

Then, a direct current flows into the direct current circuit 15 via the photo coupler 14 from a positive side of the diode-bridge 13. Thereby, a direct current loop is formed.

The direct current then enters the negative side of the diode bridge 13, and is outputted to the line 3 via the relay 12.

A plurality of signals from the facsimile communication may enter into the diode bridge 13 from the line via the relay 12, and they may be output from the positive side of the diode bridge 13. Then, the output enters the transducer 16 via the photo coupler 14, the direct current circuit 15, and the condenser 16. A signal appearing at one end of the primary side winding when a current flows through the primary side winding may enter the negative side of the diode bridge 13 via the direct current circuit 15, and return to the line via the relay 12.

Further, the signals transmitted to the secondary side of the transducer 17 are separated into a transmission signal and a reception signal using a conventional two-line circuit and four-line circuit (not shown). After that, the signals may be transmitted to the MODEM, and are modulated and demodulated as appropriate.

A transistor Tr2 (and similar devices) provided in the route B illustrated in FIG. 3 might form a direct current limiting device. A relay and a photo-coupler or similar devices may constitute a switching device 151 illustrated in FIG. 5. The operating section 28 and the principal control section 21 or the like may constitute a designation device. The network control section 1 including the photo-coupler 14 and the transducer 17 or the like may constitute a dial call-generation device. The display section 29 or the like may form a display device. The operating section 28 or the like may form a setting device. Further, the network control section 1 including the call signal detection circuit 19 may constitute a ringing (signal) detection device.

A direct current limiting operation of the direct current circuit 15 is now described in detail referring to FIGS. 3 and 4. When a line voltage is applied to the direct current circuit 15 and is voltage divided by the resistors R2 and R3, some current may flow (or a sufficient voltage may be applied, as appropriate) to the base of the transistor Tr1. As a result, the base reaches a prescribed, transistor activating, voltage level, and some current flows from the collector to the emitter of the transistor Tr1, and accordingly, through the route A.

When the current is relatively small, the line voltage may increase in proportion to the product of the sum of the resistances of resistors R1 and R5 with a magnitude of the current, because the current flows almost exclusively through the resistors R1 and R5 of the route A. When the line voltage is additionally supplied by certain types of exchangers (not shown), a current that is larger than a prescribed value may flow through the resistor R1. This is because the magnitude of the current flowing through the circuit may increase as a result of the application of the additional voltage.

Furthermore, a current may flow (or a voltage may be applied to, as appropriate) to the base of the transistor Tr2 through the resistor R4, and thereby the base may reach a prescribed voltage value activating the transistor Tr2. With the transistor Tr2 in the active state, a small magnitude current may flow from the emitter to the collector of the transistor Tr2, and further flow through the resistor R2.

Then, since the resistance of the resistor R2 is large enough, the voltage of the line 3 may increase, even if the current is small. Thus, the current flowing through the direct current circuit 15 is limited to a prescribed value. Namely, a large line voltage may be required when more current flows through the route A due to an increase in the voltage across the resistor 2.

Figure 4A:
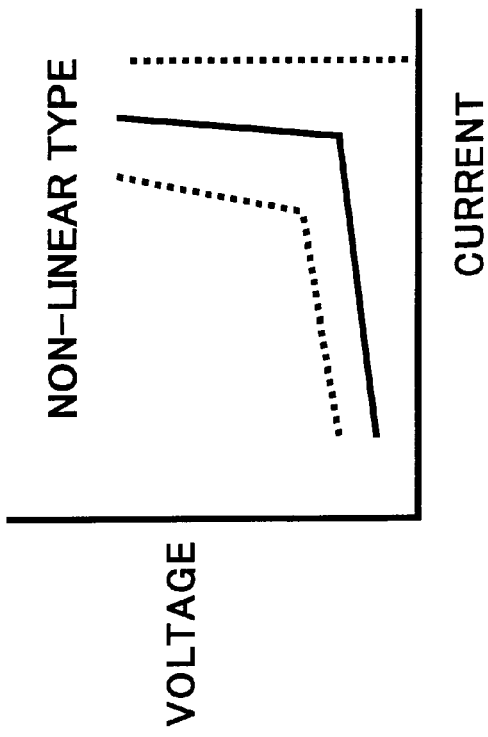
FIGS. 4A and 4B are graphs illustrating exemplary electrical characteristics of the direct current circuit, i.e., the direct current circuit having non-linear characteristics and the direct current circuit having linear characteristics.
Figure 4B:
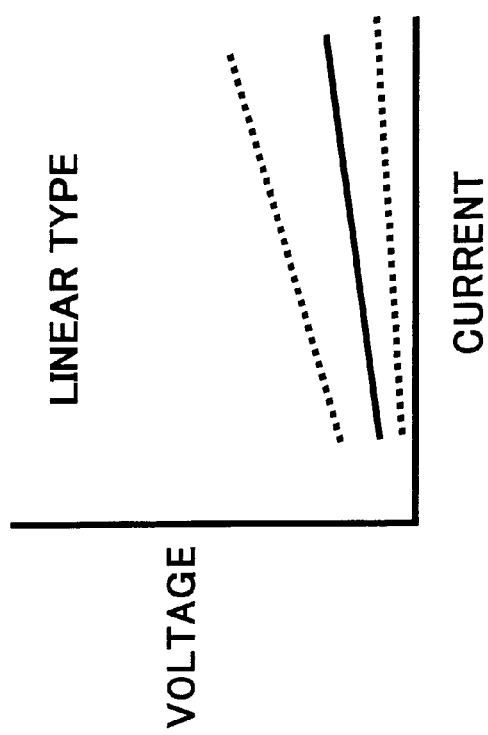

Accordingly, the direct current having nonlinear characteristics (i.e., the current is substantially limited to a prescribed magnitude) as illustrated in FIG. 4B, can be attained. Since it is required by the European unified standard (CRT 21) to limit the current to 40 mA, a value of the resistor R1 may be chosen while considering of the activation voltage of the transistor Tr2.

Since the flow of current may be determined by the resistance of the resistor R4, nonlinear direct current characteristics such as those illustrated in FIG. 4B can be attained by adjusting the resistor value in correspondence with the requirements of CRT 21.

As mentioned earlier, the nonlinear direct current characteristics are inherent to the European unified standard, whereas the direct current characteristics in countries that do not employ the unified European standard are generally linear. Further, the direct current characteristic for internal line exchangers, such as a PABX, is generally linear.

Figure 5:
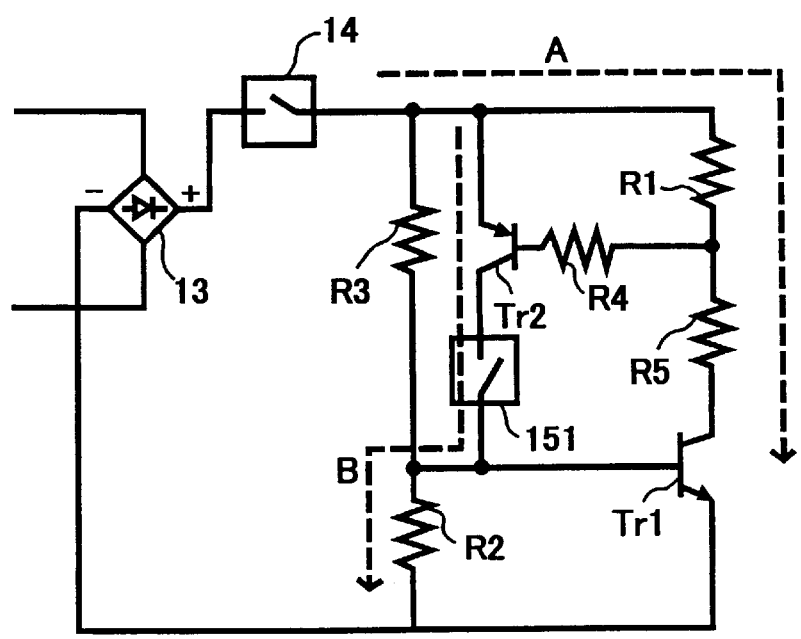
FIG. 5 is a chart illustrating an exemplary construction of the direct current circuit of the second embodiment.

The second embodiment is now described referring to FIG. 5. An embodiment of another the direct current circuit 15 is illustrated therein. The construction of a network control section 3 and a facsimile apparatus are substantially the same as in the first embodiment.

A switching device 151 may be provided between a transistor Tr2 and the resistor R2 in the direct current circuit 15, and may be configured to optionally connect to and disconnect from a route B. The switching device 151 may be formed from a relay or a photo coupler or a similar device controlled by the principal control section 21 via a signal line (not shown).

A setting operation for setting an operating condition of the relay, i.e., either limiting a direct current or not, can be performed in the following manner. A service person or a user may operate a display section 29 using a key or a similar device provided on the operating section 28, and may display a selection screen.

The service person may then select and input to the selection screen ON/OFF signals, respectively representing that the direct current limiting operation should be one of executed and stopped. The inputted contents may be transmitted from the operating section 28 to the principal control section 21, and may be set and stored in a direct current limitation ON/OFF flag provided in the RAM 24. The principal control section 21 may instruct the switching device 151 to set and clear direct current limitation and non-limitation modes via the signal line, and may control direct a current to flow through either of the routes A or B.

Figure 6:
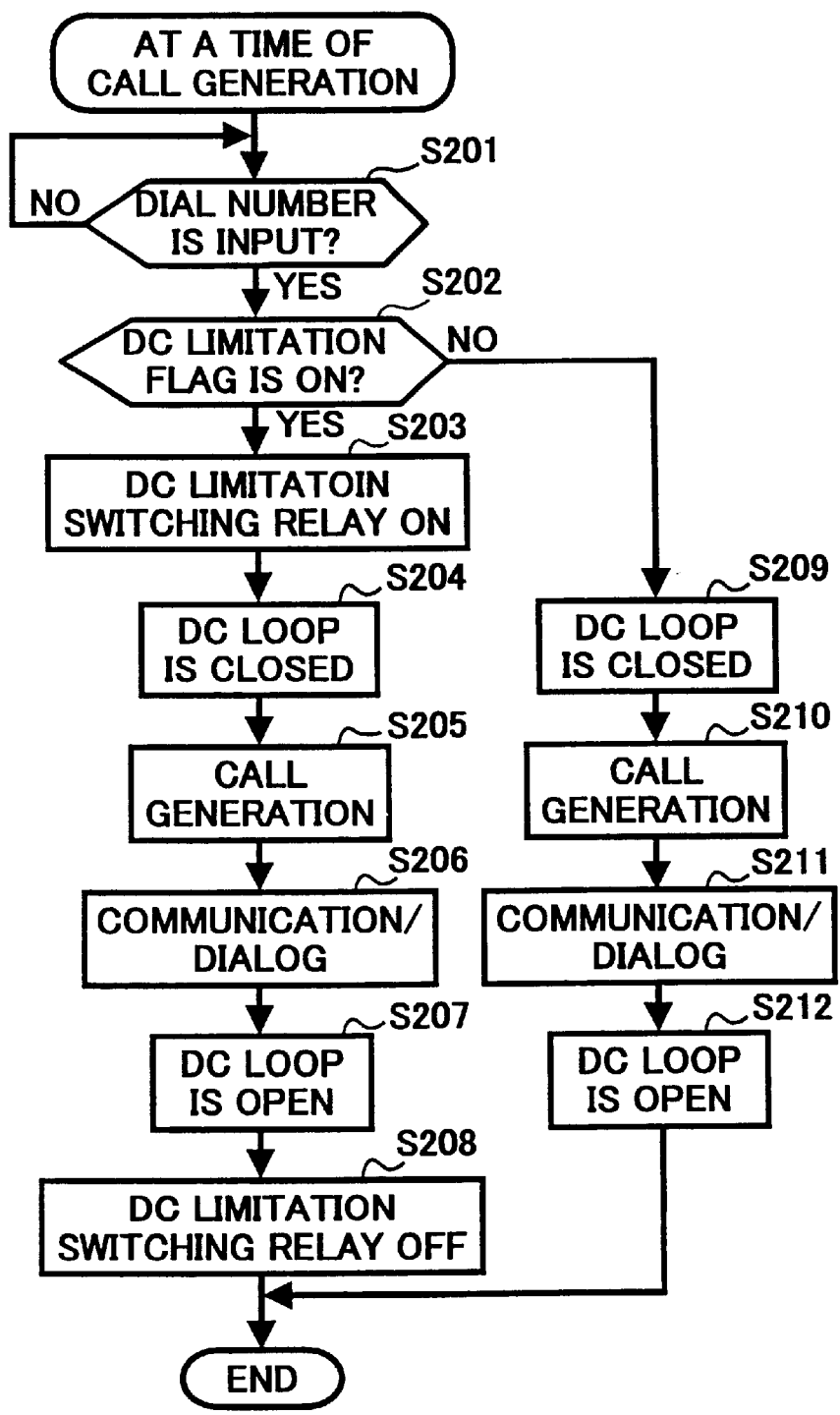
FIG. 6 is a flowchart illustrating an exemplary switching operation for switching to a direct current limiting mode, executed at a time of call generation in the second embodiment.

When the route B is cut off between the transistor Tr2 and the resistor R2, a current may flow only through the route A, and direct current characteristic satisfying the linear type standard as illustrated in FIG. 4A may be obtained. A direct current limiting operation executed when any call such as a telephone call or a facsimile call is generated is now described referring to FIG. 6. The dial call generation should be an auto call generation.

When a call is to be generated, i.e., a user starts inputting a dial number as a transmission sign through the operating section 28 (Yes in step S201), the principal control section 21 may confirm a status of the direct current limitation ON/OFF flag corresponding to the dial number (in step S202).

If it determines that the direct current limitation ON/OFF flag is in the active state (Yes in step S202) the principal control section 21 may turn ON the relay of the switching device 151 (in step S203). Then, the transistor Tr2 and the resistor R2 are connected to each other, and thereby it is possible for current to flow through the route B. Further, by turning ON the photo coupler 14 and thereby closing a direct current loop (in step S204), a direct current is simultaneously limited to a prescribed value. As a result, a direct current having nonlinear characteristics may be generated, because the route B may limit a current flowing through the direct current circuit in a same manner as mentioned earlier.

Hence, the photo coupler 14 may be turned ON/OFF when dial pulses are to be transmitted. The MODEM 22 may execute dial call generation (in step S205) when a DTMF as a tone signal or a PB signal as a dial pulse signal is transmitted. After that, when communication and dialog are completed (in step S206), the direct current loop may be opened as a sign of completion of the communication and dialog (in step S207), and the relay of the switching device 151 may be turned OFF (in step S208). Thereby, all operations are finalized.

On the other hand, if it is determined in step S202 that the direct current limitation ON/OFF flag is in the OFF state, the relay of the switching device 151 may not be turned ON, i.e., it retains an initial state or an OFF state, and thereby the route B is cut off between the transistor Tr2 and the resistor R2. The direct current loop may then be closed by turning ON the photo coupler 14 (in step S209), and direct current having linear characteristics may be generated by the route A. Further, a prescribed call generating operation may be executed as mentioned above (in step S210). When communication and dialog are completed (in step S211), the direct current loop is opened, and thereby all operations are finished (in step S212).

Figure 7:
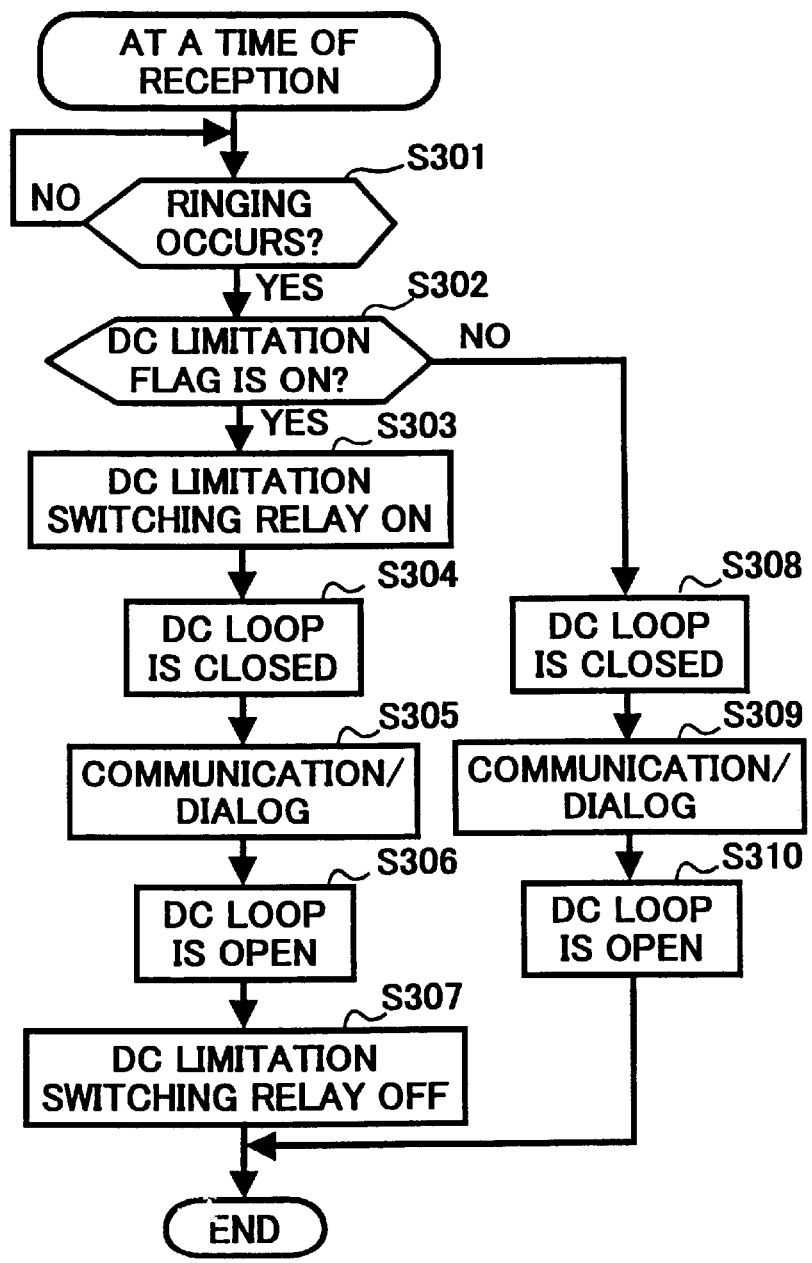
FIG. 7 is a flowchart illustrating an exemplary switching operation for switching to a direct current limiting mode, executed at a time of reception in the second embodiment.

A direct current limiting operation that is performed during any reception is now described referring to FIG. 7. Ringing reception should be auto reception.

When a ringing signal (as a sign of reception) is input from the line 3 via a call signal detection circuit 18 (Yes in step S301), the principal control section 21 may confirm the direct current limitation ON/OFF flag stored in the RAM 24 corresponds to the ringing signal.

When it is determined that the direct current limitation ON/OFF flag is in the active state, the relay as a switching device 151 is turned ON (in step S303) and the transistor Tr2 is connected with the resistor R2 so that a current flows through the route B. The direct current may be limited to a prescribed value in the same manner (as described earlier) when the photo-coupler 14 is turned ON and thereby the direct current loop is closed (in step S304). Thus, a direct current having nonlinear characteristics may be generated by the route B.

After that, when communication and dialogue are completed (in step S305), the direct current loop is opened (in step S306), and the switching device 151 is turned OFF (in step S307). Thereby, all operations are finalized.

On the other hand, when it is determined that the direct current limitation ON/OFF flag is not in the active state (in step S302), the switching device 151 is not turned ON, i.e., it keeps an initial state or an OFF state. After that, the photo-coupler 14 is turned ON, so that the direct current loop is closed (in step S308) Thus, the route A, as described earlier, may generate the direct current having linear characteristics. When the communication and dialogue are completed (in step S309), the direct current loop is opened (in step S310), and all operations are finalized.

Thus, according to this embodiment, a direct current having nonlinear characteristics may be generated by connecting the transistor Tr2 with the resistor R2 having a relatively large resistance via the switching device 151. Thereby, a current flowing through the direct current circuit 15 may be limited to a prescribed value. Further, a direct current having linear characteristic may be generated by breaking the connection between the transistor Tr2 and the resistor R2 using the switching device 151. Since a direct current generating mode can be switched from a current limiting mode to a non-current limiting mode (or vice versa) using substantially the same network control section 1 and the switching device 151, the facsimile can be used in both types of countries, i.e., a country that has adopted the European unified standard and a country that has adopted a different communication standard. In addition, a plurality of network control sections 1 is not required.

As a modification, a service person can optionally set a direct current limitation ON/OFF mode by switching a bit switch or a dip switch.

Figure 8:
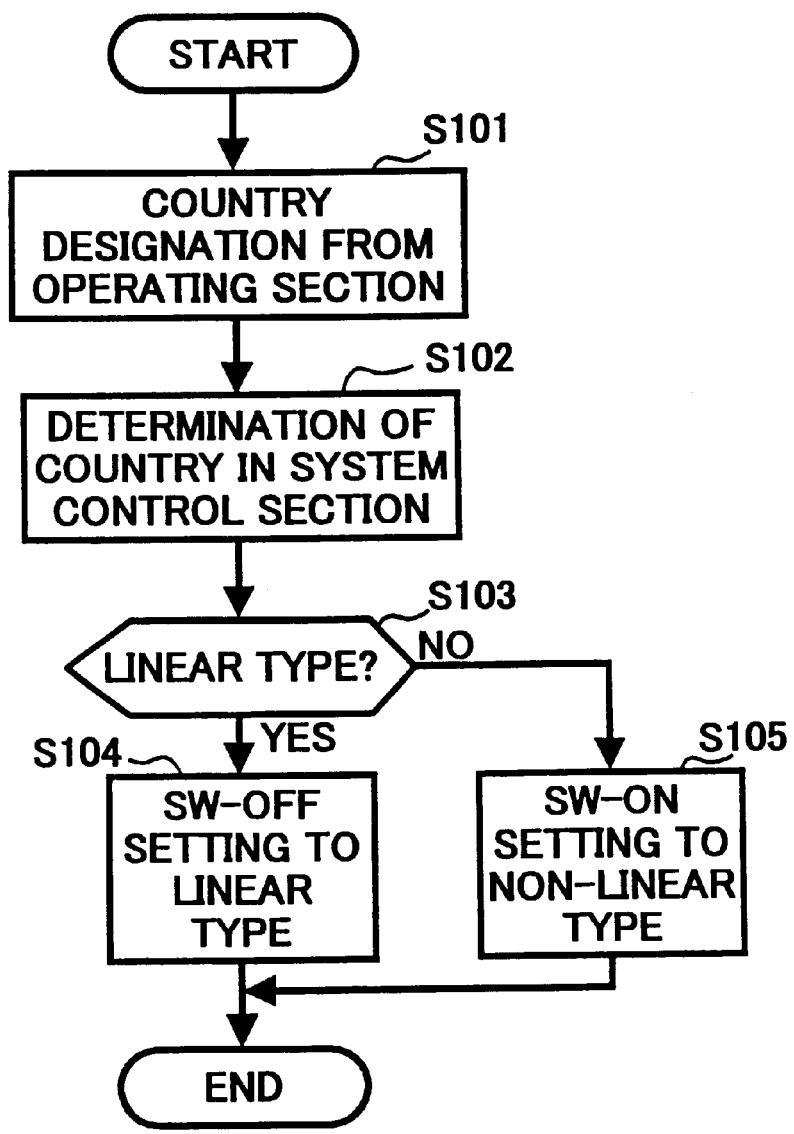
FIG. 8 is a flowchart illustrating an exemplary switching operation for switching to a direct current limiting mode, executed in the third embodiment.

The third embodiment is now described referring to FIG. 8. The construction of a network control section 1 having a direct current circuit is substantially the same as the second embodiment.

A switching condition of the switching device 151 may be predetermined depending on a country, so that electrical characteristics of the direct current is recorded for each country beforehand. Namely, information related to the country including a name, a country code, code number, or the like may be stored in a RAM and/or similar devices. Further, the principal control section 21 may switch the switching device 151 based on the information, i.e., the switching condition.

Specifically, a prescribed country is designated (in step S101) by operating a country designation key provided on the operating section 28 when a facsimile apparatus is to be purchased or shipped. The country designation information is transmitted from the operating section 28 to the principal control section 21, and the country is recognized. It is later determined if the standard of the country is linear (in step S102).

If the standard is linear, the transistor Tr2 and the resistor R2 are disconnected from each other and accordingly, the route B is cut off. Thus, a direct current having linear characteristics may be generated by the route A (in step S104). On the other hand, when the standard of the country is nonlinear, the transistor Tr2 and the resistor R2 may be connected with each other and a direct current may accordingly be limited by the route B. Thereby, a direct current having nonlinear characteristics may be generated (in step S105).

According to the third embodiment, since the switching device 151 may automatically operate according to a communication standard of the country to which the communication is transmitted or from which the communication is received, when a prescribed country is designated, the direct current characteristics can properly and automatically be attained using a facile operation.

Figure 9:
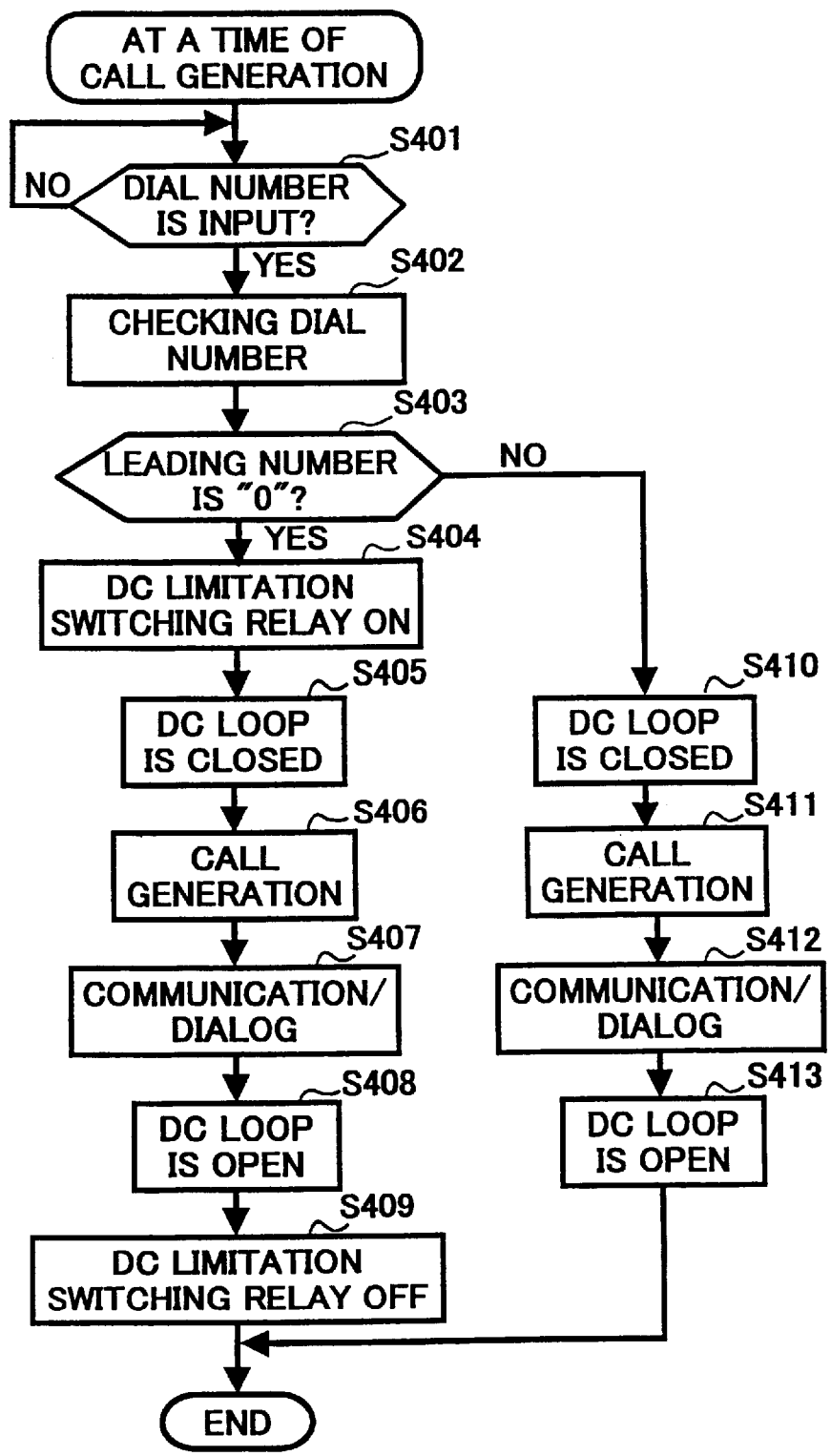
FIG. 9 is a flowchart illustrating an exemplary switching operation for switching to a direct current limiting mode, executed at a time of call generation in the fourth embodiment.
Figure 10:
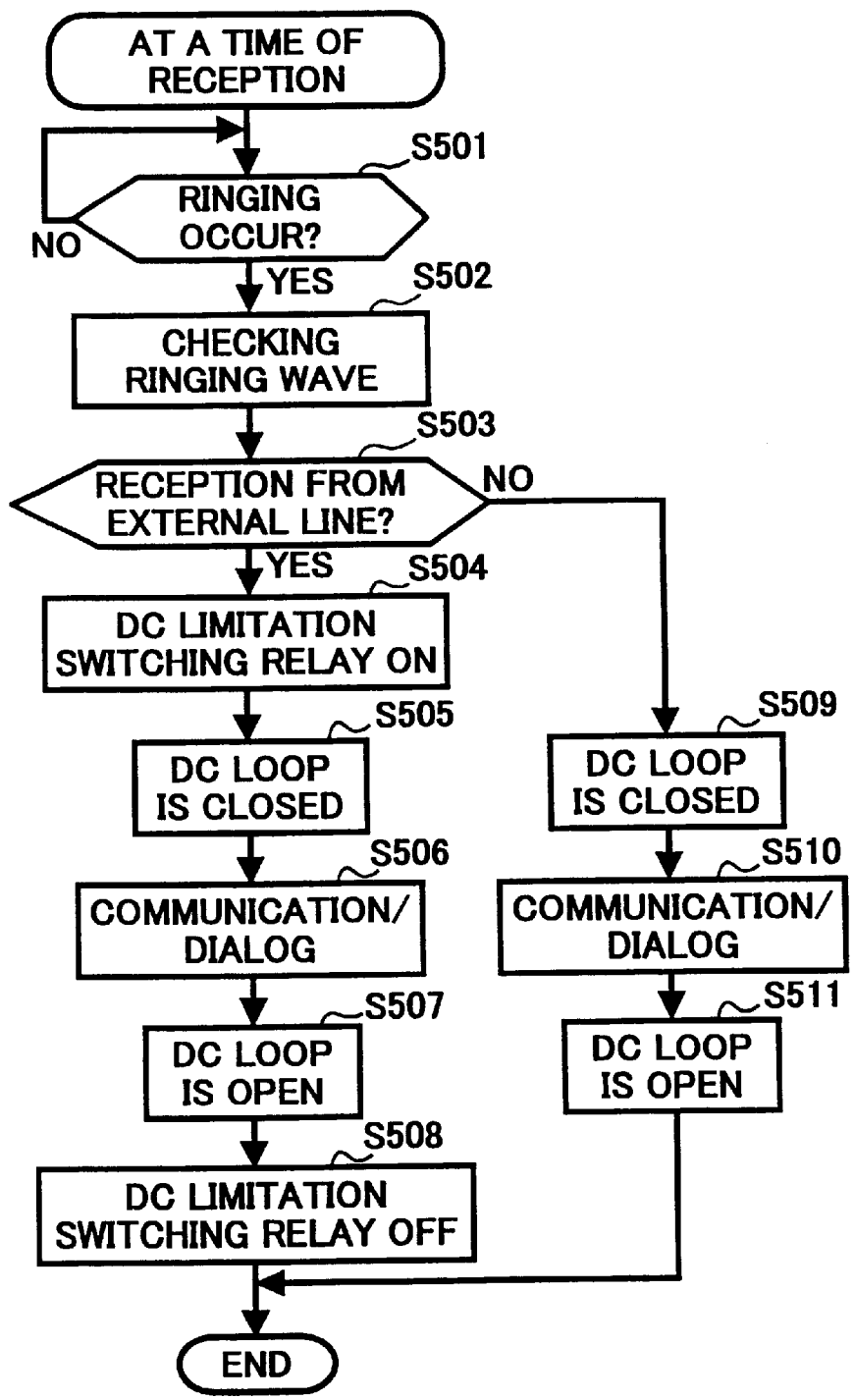
FIG. 10 is a flowchart illustrating an exemplary switching operation for switching to a direct current limiting mode executed at a time of reception in the fourth embodiment.

The fourth embodiment is now described referring to FIGS. 9 and 10. A construction of a network control section 1 having a direct current circuit 15 is substantially the same as in the second embodiment. The network control section 1 may include a photo-coupler and a transducer or the like. The network control section 1 may include a call signal detection circuit 19 or the like. When call is generated, the principal control section 21 may determine from a dial pulse or a dial number of a DTMF signal or a PB signal transmitted from the network control section 1, whether it is communication to be practiced by the general public line network or the other. An ON/OFF operation may be automatically executed by the switching device 151 based on the determined result. Specifically, since external line call generation occurs when the dialed number is zero, the switching device 151, only in this case, may connect the transistor Tr2 to the resistor R2. Accordingly, a direct current having nonlinear characteristics suitable for the European unified standard is generated, and thus the current flowing through the circuit is limited to a prescribed value, as mentioned earlier.

On the other hand, when any call signal is received and detected by the network control section 1, the principal control section 21 may compare the ringing wave of the call signal with ringing wave information, e.g., network control use parameters for the general public line, which has been previously stored in the RAM 24 or the ROM 23. If those correspond to one another, since the ringing wave may be assumed to be transmitted from the external line, i.e., communication from the general public line network, a direct current having nonlinear characteristics may be generated. This may be done by operating the switching device 151 in the same manner as mentioned earlier only in this case.

To execute the above-mentioned operation, prescribed information representing transmission from the external line and the other representing transmission from the internal line, for example, may be preset through the operating section 28 and stored in the RAM 24, so that an internal line, i.e., a line except for the general public line, and an external line, i.e., the general public line can be recognized. Further, a variety of parameters, such as the wave of a ringing signal and its level or the like, related to network control and indicative of either external or internal lines, can be previously inputted and set using the bit switch or similar devices provided on the operating section 28. These parameters can also be stored in the RAM 24. Such information may be referred to when determining if the transmission is from either the internal line or the external line.

A direct current limiting operation executed in this embodiment when any call is generated is now explained referring to FIG. 9. This embodiment presupposes that external call generation requires a direct current limiting operation, and a switching operation for switching to the external line is executed when the first dialed number is zero. Further, internal call generation does not require the direct current limiting operation, and is performed when the first dialed number is not zero. Further, dial call generation should be auto call generation.

When a user starts inputting a dial number of a recipient as a transmission signal through the operating section 28 (in step s401), the principal control section 21 may compare the dial number with a prescribed internal/external switching number stored in the RAM 24 (in step S402).

If the leading number is zero (in step S403), since it represents the external line call generation, the relay of the switching device 151 is turned ON (in step S404), and the transistor Tr2 is connected to the resistor R2, thereby enabling a current to flow through the route B. Further, the direct current loop is closed by turning ON the photo-coupler 14 in the earlier mentioned manner (in step s405), and thereby the route B limits the current flowing through the direct current circuit 15. Thus, a direct current bearing nonlinear characteristic may be generated.

A call generating operation may then be executed (in step S406). The direct current loop may be opened (in step S408) and the relay as the switching device 151 may also be turned OFF (in step s409) when communication and dialogue are completed (in step S409). Thereby, all operations are finalized.

On the other hand, since internal call generation occurs when the first dialed number is not zero, control section 21 does not turn ON the switching device 151, i.e., it retains an initial state or an OFF state, and may disconnect the transistor Tr2 from the resistor R2. In other words, the route B does not conduct significant amounts of current (in step S403). Further, the principal control section 21 may close the direct current loop by turning ON the photo-coupler 14 (in step s410). Thereby, a direct current having linear characteristics may be generated using the route A in the same manner as mentioned earlier. A call generating operation may then be executed (in step s411). The direct current loop may be opened (in step S413), when the communication and dialogue are completed (in step S412), thereby finalizing all operations.

A direct current limiting operation in this embodiment executed when any reception is made is now explained referring to FIG. 10. It may be determined from, for example, the frequency of the ringing wave, it's cadence, and/or an ON/OFF time period, that the reception of either an external line communication requiring direct current limitation or an internal line communication not requiring the direct current limitation has occurred. The ringing signal reception should be executed by automatic recognition of a ringing signal and the reception thereof.

When a ringing signal is used as a reception sign and is input from the line 3 (in step S501), the principal control section 21 may compare the ringing signal with the ringing parameters of the internal and external lines stored in the RAM 24. This corresponds to examining the ringing wave in step s502. If the received signal is determined to originate from the external line (in step S503), since direct current limitation is required, the relay switching device 151 is turned ON as described earlier (in step S504), and the transistor Tr2 is connected to the resistor R2.

Further, a direct current loop is closed by turning ON the photo-coupler 14 (in step S505), and a direct current having nonlinear characteristics is generated. This occurs because a current flowing the direct current circuit is limited by the route B in the same manner as mentioned earlier. When communication and dialogue are completed (in step S506), the direct current loop is opened (in step S507) and the relay of the switching device 151 is turned OFF (in step S508). Thereby, all operations are finalized.

On the other hand, if the received signal is determined to originate from the internal line (in step s503), a direct current limitation is not required the switching device 151 is not turned ON. In other words, the switching device 151 retains the initial state or the OFF state. Thus, the transistor Tr2 remains disconnected from the resistor R2. When the photo-coupler 14 is turned ON, and accordingly the direct current loop is closed (in step S509), a direct current having linear characteristics may be generated by the route A with the route B being disconnected. When communication and dialogue are completed (in step S510), the direct current loop is opened (in step S511), and all operations are finalized.

As a modification in some embodiments, an internal line button (that is pressed when internal line transmission is performed) and an external line button (that is pressed when external line transmission is performed) can be provided. Thus, an operation similar to the "zero call generation" mentioned earlier can be performed when the external line button is pressed. In this case, a step for determining if the internal or external line button has been pressed may substitute for the steps from S401 to S403 mentioned above.

As another modification in some embodiments, if the internal line use parameter can be extensively set more easily than the external line use parameter, then a parameter representing non-direct current limitation can be added to the internal line use parameters. In this case, the relay switching device 151 can be turned OFF using the parameter when the mode is switched to the internal line mode. The relay of the switching device 151 may be turned ON when a mode is switched to the external line mode.

As yet another modification, a parameter representing direct current limitation can be added to the external line use parameters, and the relay of the switching device 151 may be turned ON using the external line use parameter in response to switching to the external line mode. In such a case, a parameter setting screen can be displayed on the display section 29, and a user or the like can set the above-mentioned internal or external line use parameters with a key operation through the operating section 28. Otherwise, a bit switch for setting a variety of parameters can be provided on the operating section 28, and a service person or the like can select and set a prescribed parameter (s) representing either non-direct current limitation or direct current limitation as appropriate.

Thus, it is possible to limit the loop state direct current by inputting a prescribed signal through either the bit switch or the setting screen as mentioned earlier, and by turning ON the switching device 151 when external line call generation occurs or an external line transmission is received before closing the direct current loop.

Thus, a prescribed network interface suitable for the network characteristics of the exchanger can be automatically selected based on whether line communications are external or internal, since parameter(s) representing non-direct current limitation may be included in the internal line use parameters and parameters representing direct current limitation may be included in the external line use parameters.

The present invention can include a wide range of applications of a network control section (NCU) having an interface function with a communication line in the communication apparatus. Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. A communication apparatus including a network control unit configured to interface with a telephone line, for performing line control for facsimile communications, said network control unit comprising:

a direct current circuit configured to carry a loop state direct current for facsimile operations of the communication apparatus; and an electrical characteristic changing device configured to change an electrical characteristic of the direct current circuit for facsimile operations by limiting the direct current flowing through the direct current circuit, the electrical characteristic changing device including first and second transistors, wherein in order to limit the direct current, the first transistor is turned ON when the direct current is relatively small, and the second transistor is turned ON when the direct current is relatively large.

2. A communication apparatus as claimed in claim 1, wherein said electrical characteristic of the direct current circuit is changed depending on a country in which said communication apparatus is to be used.

3. The communication apparatus as claimed in claim 2, wherein said electrical characteristic is changed based on a designation of the foreign country.

4. A communication apparatus including a network control unit configured to interface with a telephone line, said network control unit comprising:

a direct current circuit configured to carry a loop state direct current, said direct current circuit having a plurality of selectable electrical characteristics;

an electrical characteristic alternating device configured to selectively alternate one of the plurality of electrical characteristics of said direct current circuit with another of the plurality of electrical characteristics based on a kind of desired communication, wherein said one of said plurality of electrical characteristics is alternated by said electrical characteristic alternating device by limiting the direct current flowing through said direct current circuit;

a current limiting device, wherein the direct current flowing through said direct current circuit is limited by said direct current circuit to a prescribed value, said current limiting device being provided in the direct current circuit;

a switching device configured to select one of the direct current limiting device configured to limit the direct current to the prescribed value and a direct current non-limiting circuit configured not to limit the direct current; and a dial call-generating device configured to generate one of a dial pulse and a tone signal, wherein said direct current non-limiting circuit being selected when said one of said dial pulse and said tone signal being associated with a network other than a general public line.

5. The communication apparatus as claimed in claim 4, wherein the direct current limiting device being selected when a dial number of the dial call generating device includes a prescribed number indicating an external communication.

* * * * *